Dec. 5, 1961 W. O. MAHER 3,011,823
VEHICLE SAFETY STEERING COLUMN AND PROTECTIVE SHIELD
Filed May 8, 1959 2 Sheets-Sheet 1
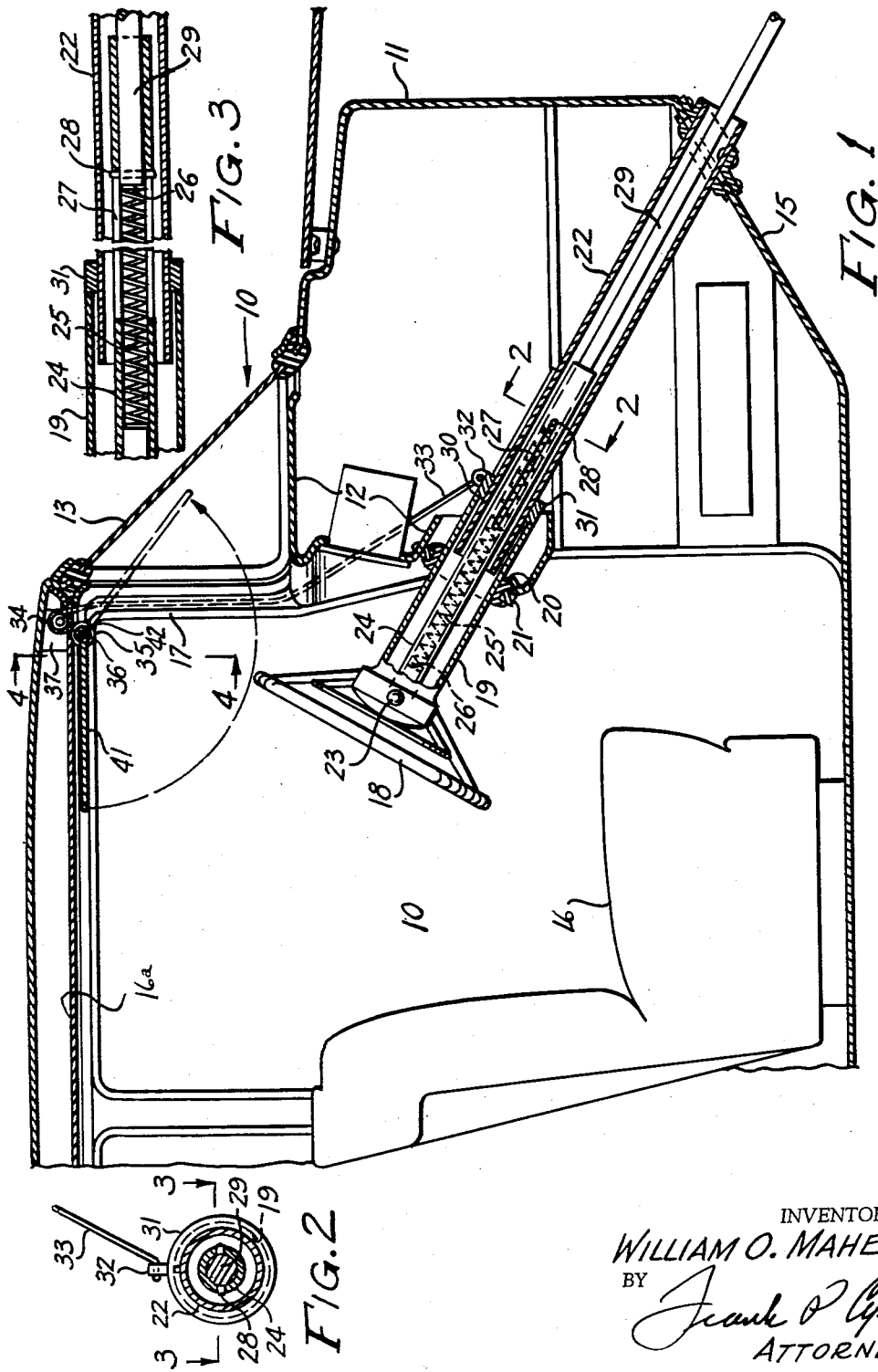
INVENTOR.
WILLIAM O. MAHER
BY
ATTORNEY Dec. 5, 1961  W. O. MAHER  3,011,823
VEHICLE SAFETY STEERING COLUMN AND PROTECTIVE SHIELD
Filed May 8, 1959  2 Sheets-Sheet 2

INVENTOR.
WILLIAM O. MAHER
BY
ATTORNEY

United States Patent Office 3,011,823
Patented Dec. 5, 1961

3,011,823
VEHICLE SAFETY STEERING COLUMN
AND PROTECTIVE SHIELD
William O. Maher, 25 Beach St., North Adams, Mass.
Filed May 8, 1959, Ser. No. 812,025
1 Claim. (Cl. 296—84)

This invention relates to a safety device and more particularly to a safety device for motor vehicles having steering columns and windshields adjacent the driver's seat.

A primary object of the invention resides in the provision of a steering post and column which will telescope upon impact, thus avoiding the possibility of driving the steering post through the driver's body.

An additional object of the invention is the provision of such a collapsible or telescopic steering post and column so arranged as to provide no interference with the normal steering of the vehicle.

A further object of the invention resides in a shield, which may comprise a conventional glare shield which is pulled into a protective position in front of the windshield of the vehicle in the event of a collision to protect the driver from glass in the event that the windshield is broken.

Still another object of the invention is the provision of such an arrangement which is substantially instantaneous in operation upon the impact of a vehicle in collision.

A still further object of the invention is the provision of such a safety device which is sturdy and durable in construction, reliable and efficient in operation, and relatively simple and inexpensive to manufacture, assemble, and utilize.

Still another object resides in the combinations of elements, arrangements of parts, and features of construction, all as will be more fully pointed out hereinafter, and disclosed in the accompanying drawings, wherein there is shown a preferred embodiment of this inventive concept.

In the drawings:

FIG. 1 is a longitudinal vertical section taken through the front portion of a motor vehicle disclosing the collapsible steering column of this invention.

FIG. 2 is an enlarged sectional view taken substantially along the line 2—2 of FIG. 1 as viewed in the direction indicated by the arrows.

FIG. 3 is an enlarged sectional view taken substantially along the line 3—3 of FIG. 2 as viewed in the direction indicated by the arrows.

Similar reference characters refer to similar parts throughout the several views of the drawings.

Figure 4:
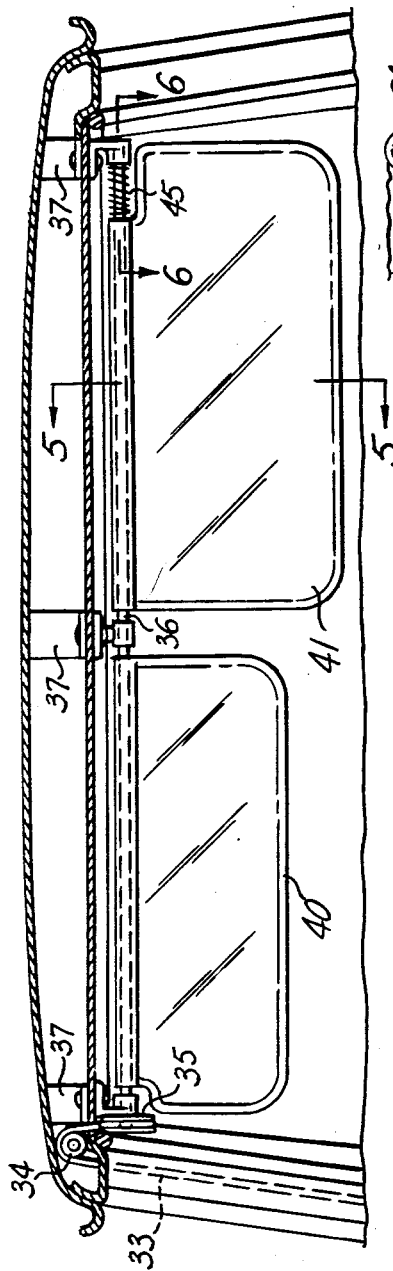
FIG. 4 is a fragmentary sectional view taken transversely across a motor vehicle looking forward showing the shield comprising a feature of this invention.
Figure 5:
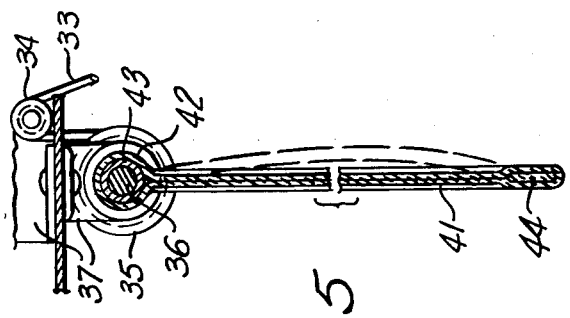
FIG. 5 is an enlarged sectional view taken substantially along the line 5—5 of FIG. 4 as viewed in the direction of the arrows.
Figure 6:
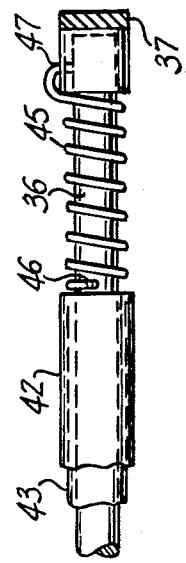
FIG. 6 is an enlarged sectional view taken substantially along the line 6—6 of FIG. 4 as viewed in the direction of the arrows.

Having reference now to the drawings in detail, there is generally indicated at 10 a motor vehicle, which includes a firewall 11, a dash 12, a windshield 13, a floor board 15, a front seat 16, a roof 16a, and a door post 17, as well as other conventionally illustrated elements. The vehicle has the usual steering wheel 18 mounted on a rotatable column 19 in the usual position and at the customary angle. The column 19 extends through a relatively large opening 20 in the lower or horizontal portion of the dash 12, and carries a resilient stop collar 21.

Positioned interiorly of column 19 is a second column or sleeve 22 which extends to and is fixed to the floor board 15 to provide a guide upon which column 19 may telescope.

Wheel 18 is secured, as by a pin 23, to a steering post 24 concentric with column 19, and which contains a relatively heavy compression spring 25, one end of which seats against an abutment 26 immediately adjacent wheel 18. The lower end of tubular steering post 24 is provided with aligned parallel slots 27 in which seat the ends of a pin 28 which is secured to the end of a telscoping rod 29 against the end of which the other end 30 of spring 25 abuts. Rod 29 extends downwardly through the floor board 15 and is connected at its opposite end to a conventional steering gear box (not shown) below the floor board 15.

It will thus be seen that rotation of wheel 18 is imparted to rod 29, but, at the same time, due to the telescopic arrangement of parts, wheel 18 is free to move toward the dash 12 and floor board 15 upon impact, as in the event of a collision. It will also be seen that spring 24 normally holds wheel 18 in position for normal operation.

The end of column 19 engages a ring 31 which is slidably mounted on sleeve 22, and which carries a lug 32 to which is secured one end of a cord or cable 33. Cord 33 extends upwardly inside door post 17 to a pulley 34, and thence downwardly to a pulley 35 which is fixed to one end of a visor bar 36. Bar 36 is carried by spaced supports 37, fixed to the car roof 16 and extends substantially the full width of the windshield 13 adjacent the top thereof.

A pair of visors or glare shields 40 and 41 are mounted on bar 36 and are except in size, identical. Each is comprised preferably of a pair of plates of relatively strong translucent plastic secured together and having a top mounting ring 42 which surrounds a tubular mounting sleeve 43 carried by bar 36. The arrangement is such that either shield may be adjusted manually by rotation about bar 36, but that the frictional engagement of ring 42 with sleeve 43 is sufficient to insure movement of the shields 40 and 41 upon rotation of visor bar 36 by cord 33.

Reinforcing rods 44 extend across the bottom of each shield 40 and 41. A spring 45 surrounds one end of bar 36 and has one end 48 fixedly secured thereto and its other end 47 secured to one of mounting brackets or supports 37 and serves normally to bias bar 36 to a position wherein shields 40 and 41 are raised against the vehicle roof. Obviously, upon impact occasioned by a collision or the like, movement of column 19 imparted to ring 31 will, through cord 33 cause the shields 40 and 41 immediately to move into the position shown in FIG. 4 to protect the driver from impact with the windshield.

From the foregoing it will now be seen that there is herein provided an improved safety device for vehicles which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

In a safety device for a motor vehicle in combination, a vehicle body including a dash board and a windshield, a steering column, a steering wheel carried thereby, a tubular steering post concentric with said column, a tubular sleeve on which said column telescopes upon impact, a rod extending into said steering post upon which said post telescopes upon impact, spring means in said steering post biasing said post and hence said steering wheel to extended position, means connecting said steering wheel, said post, and said rod to impart rotary motion of said wheel to said rod for steering said vehicle, a visor bar mounted across the top of said windshield, a safety shield for said windshield pivotally mounted on said visor bar, cable means connected between said column and said shield and actuated by telescoping movement of said column for pivoting said shield downwardly to windshield covering position, and spring means mounted on said visor bar biasing said safety shield to retracted position.

References Cited in the file of this patent

UNITED STATES PATENTS

| | | |
|---|---|---|
| 1,733,371 | Hall | Oct. 29, 1929 |
| 1,791,001 | Rasmussen | Feb. 3, 1931 |
| 2,100,427 | Blocker | Nov. 30, 1937 |
| 2,477,933 | Labser | Aug. 2, 1949 |
| 2,563,339 | Kellogg | Aug. 7, 1951 |
| 2,836,078 | Yonkers | May 27, 1958 |

FOREIGN PATENTS

| | | |
|---|---|---|
| 539,705 | Belgium | Dec. 1, 1955 |